US005239878A

United States Patent [19]

Orlandi

[11] Patent Number: 5,239,878

[45] Date of Patent: Aug. 31, 1993

[54] DEVICE FOR RESTRAINING BOTTLES AND SUPPORTING A BOTTLE ALIGNMENT MARK READING SYSTEM, IN LABELING MACHINERY

[76] Inventor: Ireneo Orlandi, 6/A, Via Garibaldi, San Giorgio di Mantova, Italy, 46030

[21] Appl. No.: 613,226

[22] Filed: Nov. 9, 1990

[30] Foreign Application Priority Data

Jan. 17, 1990 [IT] Italy .............................. 40009 A/90

[51] Int. Cl.[5] .............................................. G01M 19/00

[52] U.S. Cl. ............................... 73/865.9; 250/223 B; 156/379

[58] Field of Search ............................ 73/865.8, 865.9; 250/223 B; 356/240, 428; 156/DIG. 9–DIG. 17, DIG. 24–DIG. 27, DIG. 37, DIG. 44, DIG 45, 64, 378, 379

[56] References Cited

U.S. PATENT DOCUMENTS

| | | | |
|---|---|---|---|
| 3,150,260 | 9/1964 | Mathias | 250/223 B |
| 3,348,049 | 10/1967 | Stacey | 250/223 B X |
| 3,415,350 | 12/1968 | Murphy | 250/223 B X |
| 3,651,937 | 3/1972 | Kronseder | 250/223 B X |
| 3,917,396 | 11/1975 | Donohue et al. | 355/309 X |
| 4,369,214 | 1/1983 | Pfülb et al. | 156/DIG. 35 |
| 4,481,064 | 11/1984 | Westlund et al. | 156/568 X |
| 4,529,469 | 7/1985 | Jorss | 156/DIG. 27 |
| 4,912,337 | 3/1990 | Wilwerding | 250/223 B X |
| 5,139,406 | 8/1992 | Hoshino et al. | 250/223 B X |

FOREIGN PATENT DOCUMENTS

| | | | |
|---|---|---|---|
| 723886 | 12/1965 | Canada | 250/223 B |

*Primary Examiner*—Tom Noland

[57] ABSTRACT

The device forms part of a bottle labeling machine, and is designed to restrain bottles (23), champagne bottles especially, by descending onto the corks, at the same time positioning an optical recognition device capable of reading a reference mark molded into or otherwise applied to the bottle to assist in bringing about its proper alignment in readiness for the subsequent labeling operation; each bottle is restrained, and the reader then positioned to detect its alignment mark, by a pair of pneumatic cam-operated mechanisms of which the ascending and descending movement coincides with the vertical axis of a single fixed head (1) by which both are slidably accommodated.

8 Claims, 3 Drawing Sheets

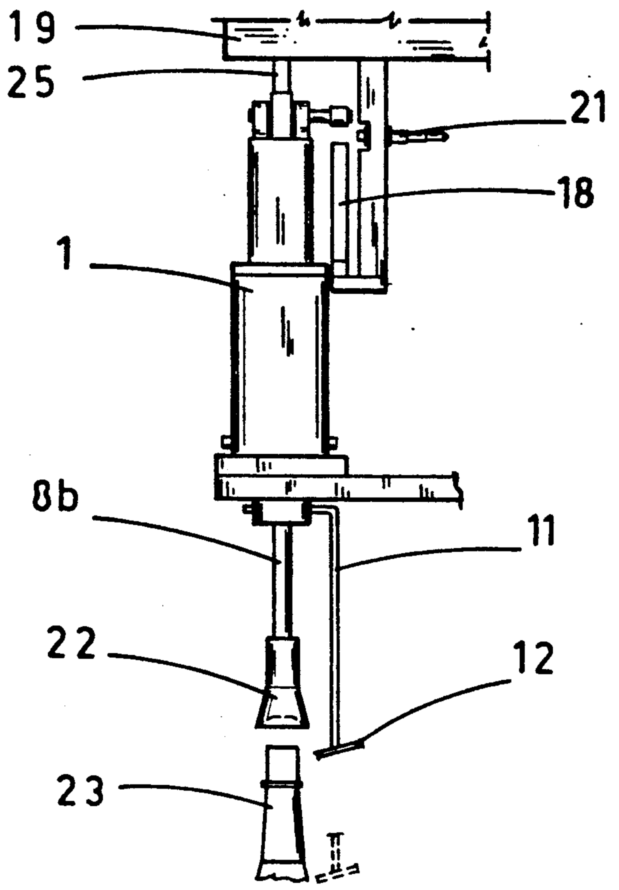
FIG1
FIG2
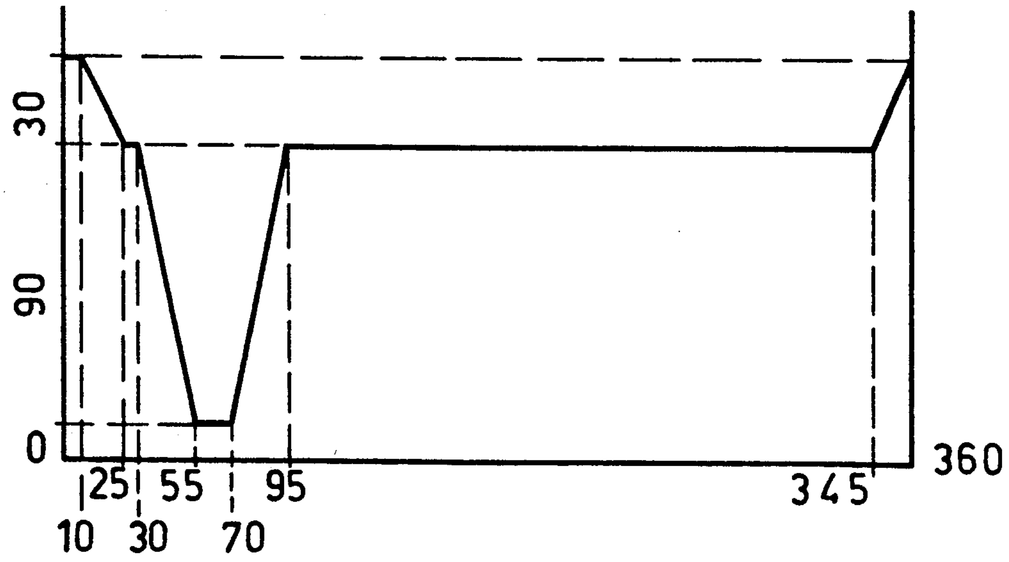

DEVICE FOR RESTRAINING BOTTLES AND SUPPORTING A BOTTLE ALIGNMENT MARK READING SYSTEM, IN LABELING MACHINERY

BACKGROUND OF THE INVENTION

The invention relates to a device which functions as a means to restrain bottles and support a bottle alignment mark reading system, in labeling machinery.

In conventional bottle labeling machines, and more especially in labelers used for champagne bottles and liquor bottles generally, each bottle must be correctly orientated, for a twofold reason.

In the case of shaped bottles, for example square or oval in section, the bottle must be aligned in such a manner as to permit applying the label correctly to the proper face and in the prescribed position.

In the case of ordinary circular section bottles, on the other hand, to which additional features are added such as bands and seals, the position of such features must be taken into account when applying the main label.

Accordingly, the need arises for suitable optical reference marks, which generally take the form of small projections molded into the glass of the bottle, or reference notches for capsules or seals in the case of champagne bottles.

Conventional labelers comprise a revolving carousel supporting two sets of heads, identical in number. Each head of the first set is designed to clamp a bottle by the cap or cork, whilst the heads of the remaining set carry means (photocells or optical fibers) capable of recognizing a reference mark afforded by the bottle and piloting the operation of a stepping motor by which the bottle is rotated into alignment.

The use of a second set of heads stems from the need to prevent obstruction, by distancing the recognition means, during the labeling operation. A head of the first set descends and secures the bottle, whereupon a head of the second set carrying the photocell or optical fiber descends to read the position of the bottle, reascending before the labeling operation commences.

Such an embodiment is characterized by high cost, complexity in construction and considerable bulk, given that each bottle passing through the machine is serviced by two heads.

Moreover, the heads will normally comprise height adjustment systems incorporating springs, of which the pressure exerted downwardly on the bottles is neither uniform, being dependent upon the height of the bottle, with or without its cap or cork, nor able to guarantee a secure clamping action with the pedestal plate in the case that the bottle has been capped or corked defectively.

These spring loaded clamping systems in fact betray poor reliability inasmuch as the lack of uniform pressure, especially when such pressure is weakly applied, can result in the bottle being overturned. Furthermore, failure of the springs can not only cause serious damage to the machine, but the spring loaded system also imposes notable limitations on the speed of the alignment step.

The object of the present invention is to overcome the drawbacks mentioned above, and in particular to provide a device of simple, economical and compact embodiment that is dependable in operation and free from the risk of hitches and stoppages attributable to spring loaded systems and their inability to exert a uniform restraining pressure on the caps or corks of bottles.

SUMMARY OF THE INVENTION

The stated object is comprehensively realized in a device for restraining bottles and supporting a bottle alignment mark reading system in a labeling machine, as disclosed and claimed herein. According to the invention, such a device comprises a single set of heads associated with the carousel of the labeler, each head slidably accommodating means for restraining a bottle by its cap or cork, together with means by which to support a reference mark reader for the alignment of the bottle.

BRIEF DESCRIPTION OF THE DRAWINGS

The invention will now be described in detail, by way of example, with the aid of the accompanying drawings, in which:

FIG. 1 is a side elevation illustrating the device in its entirety;

FIG. 2 is a graphic illustration of the different positions imposed by a cam forming part of the device;

DESCRIPTION OF THE PREFERRED EMBODIMENTS

Figure 3:
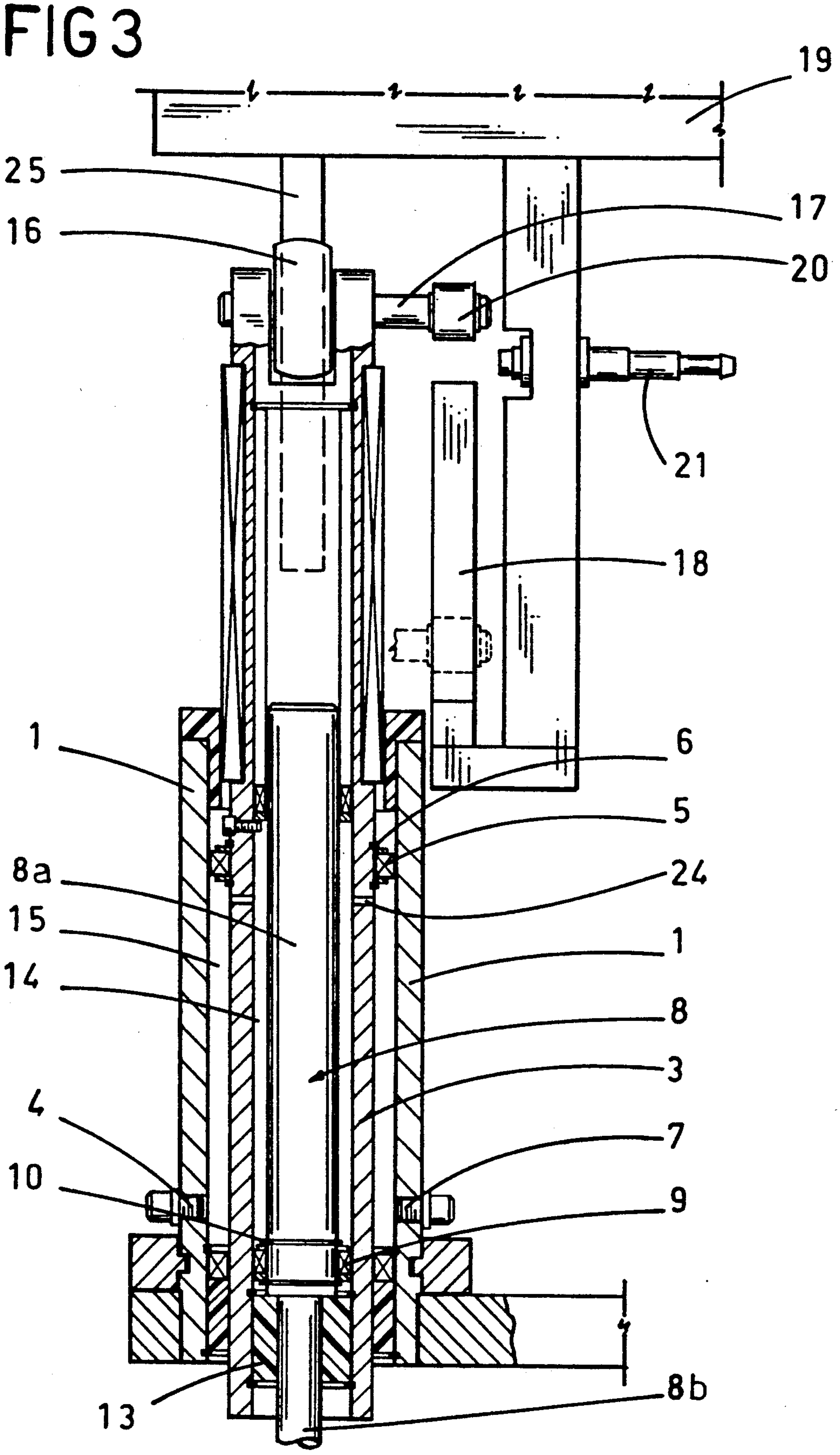
FIG. 3 illustrates a detail of the device in side elevation.
Figure 4:
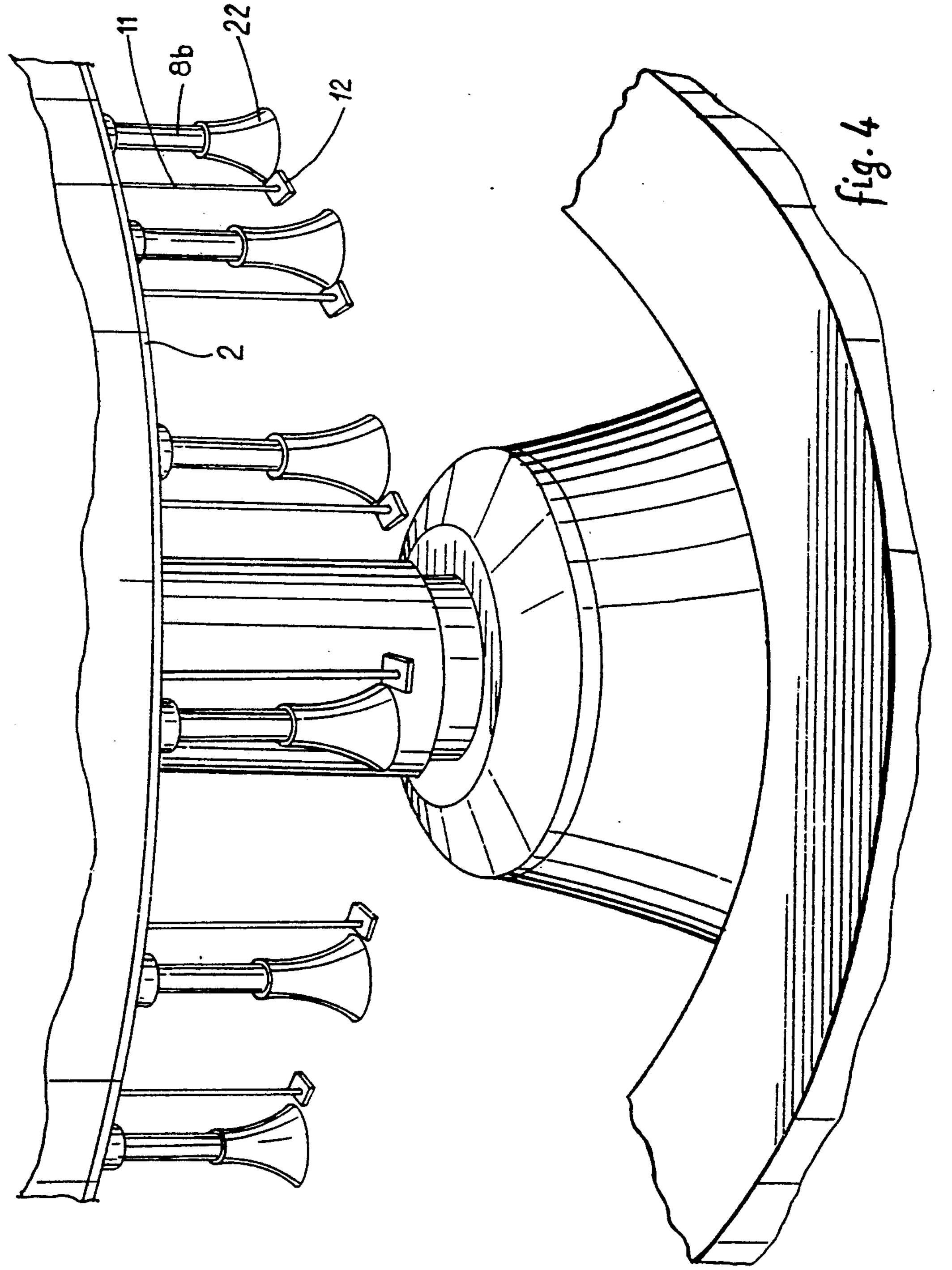
FIG. 4 illustrates a plurality of heads mounted on a carousel.

With reference to the drawings, 1 denotes a head of hollow embodiment, mounted rigidly to a carousel 2 (shown in part) and accommodating a cylindrical element 3, encircled by a distance ring 5 with lip seals 6, which is slidable internally of a relative chamber 15 along the center axis of the head 1. 11 denotes a rod rigidly associated with the bottom end of the cylindrical element 3 and carrying an optical fiber 12 connected to reader equipment not shown in the drawings.

The cylindrical element 3, the distance ring 5 and the rod 11 thus provide means to support the mark reader of a bottle alignment system. 8 denotes a plunger positioned internally of the cylindrical element 3, of which the top part 8*a* is greater in section than a bottom part 8*b*, thereby enabling it to strike against a bushing denoted 13; the plunger 8 likewise is encircled by a distance ring 9 and lip seals 10, which serve to create a fluid-tight fit with a second chamber 14, disposed coaxially in relation to the center axis of the head, internally of which the plunger is slidably accommodated.

The lower end of the plunger 8 carries an alignment socket 22 of frustoconical embodiment, designed to descend firmly onto the cap or cork of a bottle 23. The plunger 8, the relative distance ring 9 and the alignment socket 22 provide means by which bottles are restrained.

16 denotes a roller positioned at the top end of the cylindrical element 3 and in engagement with a cam 25 mounted rigidly to a frame member 19 of the labeler.

17 denotes a pivot passing transversely through the top end of the cylindrical element 3, of which one end carries a further roller 20 designed to engage with a second cam denoted 18, mounted rigidly to the frame member 19 that supports the cam 25.

Also mounted to the frame member 21 is a sensor 21 which serves to shut off the labeling machine in case of emergency.

The head 1 affords an inlet port 4 through which to supply air under pressure, and an outlet port 7 from which the air is exhausted, connected one with the other by way of the two chambers 14 and 15, and of two further ports 24 afforded by the cylindrical element 3.

In operation, a device thus embodied passes through a number of distinctly identifiable steps, which are illustrated graphically in FIG. 2, thus:

at-rest, with the cylindrical element urged upward toward the cam, and the plunger directed downwards onto the bushing, in response to pressure of 3 bar (45 psi) or thereabouts through the inlet;

initial change of cam profile, occasioning the descent of the cylindrical element and the plunger through a distance of 30 mm (1¼") approx, in such a way as to bring the alignment socket down onto the cap or cork of the bottle, and thus restrain the bottle;

second change of cam profile, causing both the cylindrical element and the rod holding the optical fiber to descend 90 mm (3½") approx and thus permit of reading a reference mark afforded by the bottle (the exact descent distance being dependent on the position of the mark);

alignment and orientation of the bottle effected by way of a stepping motor (not illustrated, but as disclosed in application n° 40088 A/88 for Italian Patent filed by the same applicant);

third change of cam profile, causing reascent of the cylindrical element;

fourth change of cam profile, occasioning reascent of both the cylindrical element and the plunger and full release of the bottle.

In the event of malfunction occurring, for example such as a loss of air pressure from the chambers 14 and 15, the sensor 21 responds to the defective position of the pivot 17 immediately by inhibiting further operation of the device; thereafter, with contact established between the second cam 18 and the roller 20, the cylindrical element and plunger will be supported by the second cam and prevented from descending onto the bottles beneath.

Compared with conventional embodiments of the type of device in question which have two sets of heads, the device disclosed affords the further advantage of allowing a closer spacing of the heads on the carousel of the labeler.

What is claimed:

1. A device in labeling machines for restraining bottles and supporting a bottle alignment mark reading system, comprising:
   - a plurality of single heads (1) associated with a carousel (2) of the labeling machine;
   - means for restraining a bottle, accommodated internally of each head and slidable along a center axis thereof;
   - means for supporting bottle alignment mark reading means, accommodated internally of each head together with the bottle restraining means and slidable along the same center axis.

2. A device in labeling machines for restraining bottles and supporting a bottle alignment mark reading system, comprising:
   - a plurality of single heads (1) associated with a carousel (2) of the labeling machine;
   - means for restraining a bottle, accommodated internally of each head and slidable along a center axis thereof;
   - means for supporting bottle alignment mark reading means, accommodated internally of each head together with the bottle restraining means and slidable along the same center axis, wherein the means for supporting bottle alignment mark reading means consist in a cylindrical element (3) slidable vertically within and along the center axis of the head encircled by a distance ring (5), and a rod associated with a bottom end of the cylindrical element, by which a reading element of a bottle alignment mark reading system is supported.

3. A device as in claim 2, wherein said means for restraining a bottle are capable of vertical movement within and along the center axis of the head (1), and consist in a plunger (8), encircled by a distance ring (9), slidably inserted through a bushing (13) and slidably accommodated within a chamber (15) afforded internally by the cylindrical element (3), and a socket (22) of frustoconical embodiment associated with a bottom end of the plunger (8) and designed to enter into contact with a cap or cork of a bottle (23).

4. A device according to claim 3, wherein the action of the cam occasions simultaneous descent of the cylindrical element and the plunger by impinging on both as the carousel revolves.

5. A device according to claim 4, further comprising a sensor designed to respond to the proximity of a pivot associated with the head, to the end of inhibiting further operation of the device in case of emergency.

6. A device according to claim 3, comprising a first chamber located between an internal surface of the cylindrical element and a corresponding surface of the plunger, and a second chamber located between an external surface of the cylindrical element and an internal surface of the head, wherein the two chambers are interconnected and charged with air supplied under pressure from an external source, in such a way that the cylindrical element is biased toward the cam and the plunger biased toward the bushing, and hence toward the cap or cork of a bottle, by a uniformly exerted force.

7. A device according to claim 6, further comprising a second cam able to support the cylindrical element by way of a corresponding roller, and thus to disallow descent of the cylindrical element and the plunger toward the bottle in the event of one of an insufficient pressure level within the chambers or the device ceasing to operate.

8. A device as in claim 2, wherein the cylindrical element (3) is biased continuously by pressure of air supplied to the interior of the head (1) toward an upper limit position established by the profile of a cam (25) disposed above the head (1), and made to descend vertically along the center axis of the head by the action of the cam.

* * * * *